United States Patent
Hsiao et al.

(10) Patent No.: US 11,581,141 B2
(45) Date of Patent: Feb. 14, 2023

(54) LEADLESS STACK COMPRISING CERAMIC CAPACITOR

(71) Applicant: HOLY STONE ENTERPRISE CO., LTD., Taipei (TW)

(72) Inventors: Chao-Kuang Hsiao, Taipei (TW); Hung-Mou Huang, Taipei (TW)

(73) Assignee: HOLY STONE ENIERPRISE CO., LTD., Taipei (TW)

( * ) Notice: Subject to any disclaimer, the term of this patent is extended or adjusted under 35 U.S.C. 154(b) by 0 days.

(21) Appl. No.: 17/186,866

(22) Filed: Feb. 26, 2021

(65) Prior Publication Data
US 2021/0272754 A1    Sep. 2, 2021

(30) Foreign Application Priority Data

Mar. 2, 2020 (TW) ................... 109106652
Feb. 9, 2021 (TW) ................... 110104967
Feb. 25, 2021 (TW) ................... 110106777

(51) Int. Cl.
*H01G 4/12* (2006.01)
*H01G 4/30* (2006.01)
*H01G 4/012* (2006.01)
*H01G 4/232* (2006.01)

(52) U.S. Cl.
CPC .............. *H01G 4/12* (2013.01); *H01G 4/012* (2013.01); *H01G 4/2325* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 9,472,342 B2* | 10/2016 | McConnell | B23K 1/008 |
| 9,805,872 B2* | 10/2017 | Miller | H01G 4/228 |
| 10,984,955 B2* | 4/2021 | Bultitude | B23K 1/203 |
| 2014/0002952 A1* | 1/2014 | McConnell | H01G 4/12 29/25.42 |
| 2015/0340154 A1* | 11/2015 | Kim | H01G 2/22 361/275.1 |
| 2016/0104577 A1* | 4/2016 | Cho | H01G 4/2325 156/60 |
| 2016/0203913 A1* | 7/2016 | Sun | H01G 4/30 29/25.42 |
| 2017/0169955 A1* | 6/2017 | Miller | H01G 4/38 |
| 2019/0090348 A1* | 3/2019 | Bultitude | H01L 23/49827 |
| 2019/0122823 A1* | 4/2019 | Cho | H01G 2/06 |
| 2020/0005998 A1* | 1/2020 | Kim | H01G 4/40 |
| 2021/0272754 A1* | 9/2021 | Hsiao | H01G 4/30 |

FOREIGN PATENT DOCUMENTS

| | | | | |
|---|---|---|---|---|
| CN | 107629734 A | * | 1/2018 | C08K 3/08 |
| CN | 111995978 A | * | 11/2020 | C09J 9/02 |

* cited by examiner

*Primary Examiner* — Dion R. Ferguson
(74) *Attorney, Agent, or Firm* — Muncy, Geissler, Olds & Lowe, P.C.

(57) ABSTRACT

The present invention provides a leadless stacked ceramic capacitor. the capacitor body are respectively provided with internal electrode terminals. The part forms an electrical connection with the external electrodes, and a plurality of multilayer ceramic capacitors are vertically stacked, and the two adjacent external electrodes are cured to form an adhesive interface by polymer conductive adhesive, and the polymer conductive adhesive includes 75%~85% metal powder and 15%~25% viscose provide support strength and conductive channels.

19 Claims, 6 Drawing Sheets

| Item | Without Lead Frame | With Lead Frame |
|---|---|---|
| Item | Lateral thrust(N·f) | |
| 1 | 176.4 | 180 |
| 2 | 176.4 | 128 |
| 3 | 176.4 | 180 |
| 4 | 147 | 180 |
| 5 | 160.72 | 157 |
| 6 | 157.84 | 180 |
| 7 | 174.44 | 180 |
| 8 | 176.4 | 180 |
| 9 | 133.28 | 180 |
| 10 | 176.4 | 122 |
| AVG | 165.228 | 166.7 |
| MIN | 133.28 | 122 |
| MAX | 176.4 | 180 |

*FIG.5*

LEADLESS STACK COMPRISING CERAMIC CAPACITOR

This application claims the priority benefit of Taiwan patent application numbers 109106652, 110104967 and 110106777, filed respectively on Mar. 2, 2020, Feb. 9, 2021 and Feb. 25, 2021.

BACKGROUND OF THE INVENTION

1. Field of the Invention

The present invention relates to ceramic capacitor technology and more particularly, to a leadless stack comprising ceramic capacitor, especially the external electrodes of a plurality of stacked ceramic capacitors are adhered and fixed by conductive adhesive.

2. Description of the Related Art

Nowadays, the production of electronic components is gradually required to be developed in multiple processes to meet the complex signal transmission and operation between high-end electronic components, and to make the capacitors of passive components also move towards miniaturization, high capacitance, and better stability. And traditional capacitors have also been transformed into multilayer ceramic capacitors made in chip type. Coupled with the refinement of production equipment and continuous breakthroughs in process technology, not only can its size be greatly reduced, but also the production cost can be reduced, but it is usually taught with high capacity and high reliability product requirements.

The multi-layer ceramic capacitor (MLCC) in ceramic capacitors, its capacitance content is proportional to the surface area of the product and the number of layers of ceramic film stacked, and the MLCC can be directly adhered through the surface mount technology (SMT) process, and the production speed is faster. Coupled with its advantages such as easy chipization, small size and good frequency characteristics, the MLCC has become a mainstream product in the capacitor industry. The disadvantage of the MLCC is that the capacitance value is small. However, with the technological advancement of ceramic film stacking, the higher the content of its capacitance value, it can gradually replace the market applications of medium and low capacitance (such as electrolytic capacitors and tantalum capacitors, etc.), so that the relevant MLCC manufacturers are more actively engaged in research and development of capacitance values.

Furthermore, in order to form a high-capacity ceramic capacitor and assemble it on a circuit board, a stacked structure is usually formed in the form of metal leads or a lead frame. Please refer to FIG. 6, the conventional multilayer ceramic capacitor stack is to form a junction point of the two sides of the external electrode A1 of the multilayer ceramic capacitor A through solder B, and weld it to the junction surface C1 on the opposite inner side of the two lead frames C to form a stacked structure, and then welded on the circuit board by the outer leads C2 of the lead frames C. The two lead frames C can provide support strength and conductive channels at the same time, so that the total capacitance value can be improved. However, the temperature required for the welding process is mostly higher than 300° C. If the heating rate during the welding process is too fast, it will cause the multilayer ceramic capacitor A to heat up quickly and cause cracks or damages, resulting in an increase in the defect rate. If the heating rate is too slow, cleaning operations still need to be performed after using the flux, which will also cause a lot of trouble and trouble. In addition, in recent years, there has been a change to transient-liquid-phase-sintering (TLPS), such as copper (Cu)-tin (Sn) solder, to provide a more novel stacked ceramic capacitor without relying on metal leads. It is to add two different metal materials of high melting point and low melting point to the solder used at the same time, and form a stacked junction on the outer electrode end of each ceramic capacitor, so that multiple ceramic capacitors are stacked and supported each other like building blocks without collapsing. Moreover, the junction also forms a conductive path. Since the lead frame is not used for mounting, it must be able to resist the stress damage caused by the bending of the substrate, and it cannot even cause an unexpected degree of stress damage to the ceramic capacitor stacking position or the junction.

In addition, TLPS paste as a bonding material needs to rely on high temperature heating to easily form intermetallic compounds. Although it has the advantage of improving mechanical strength, high temperature heating and phase change processes will increase process variation factors. If you observe the microstructure of the sintered joints, it is easy to form hard and brittle intermetallic compounds, and even the stacking position or the surface of the bonding point forms microcracks after phase change or volume change. Even if the support strength is sufficient, it still cannot effectively provide the toughness that can resist the repeated bending or vibration of the plate. On the contrary, it will promote the stress concentration to form a source of structural damage or rupture, which limits the application of the product. Because the TLPS paste cannot be filled with nickel or tin plating after sintering, it is difficult to react with the electroplating solution to form a uniform and detailed electroplating surface. Therefore, the problem of micro cracks or micro gaps cannot be improved. This industry is eager to study the direction of improvement.

SUMMARY OF THE INVENTION

The present invention has been accomplished under the circumstances in view. It is a first object of the present invention to provide a leadless stack comprising ceramic capacitor, which lets the external electrodes of a plurality of multilayer ceramic capacitors use a polymer conductive adhesive as the bonding material to form a adhesive interface that provides support strength and conductive channels, so that the external electrodes of the multiple multilayer ceramic capacitors can be stacked vertically with each other through the adhesive interface to be electrically conductive and form a series combination. Its total capacitance value is also proportional to the number of capacitors stacked. The polymer conductive adhesive contains 75%~85% metal powder and 15%~25% viscose, which can make the adhesive interface have sufficient supporting adhesion strength, and the toughness required to absorb the bending or vibration energy of the board, and resist the bending of the repeated board or mechanical damage caused by the vibrating environment. This can eliminate the need for high-temperature heating of metal leads and TLPS paste, simplifying the process, and the operating temperature of the solderless operation of the polymer conductive adhesive is relatively low, and the process variation factors are relatively reduced.

The secondary object of the present invention is that the adhesive interface of the stacking position of a plurality of multilayer ceramic capacitors with external electrodes between each other can be electroplated, and a first plating layer and a second plating layer of an electroplating strengthening layer are formed by nickel plating and tin plating in sequence. Since the polymer conductive adhesive used in the adhesive interface contains sufficient metal powder, it can react with the electroplating solution to form a uniform and detailed electroplating surface, so that any micro cracks or micro gaps on the adhesive interface will be filled by the electroplating strengthening layer after electroplating to avoid the formation of cracked nuclei. It is also possible to co-extend each adhesive interface and the external electrodes of the multilayer ceramic capacitors to form the flat side surface of the electroplating strengthening layer, so that the electroplating strengthening layer can completely cover the external electrodes of the multiple multilayer ceramic capacitors, thereby strengthening the mechanical strength of the adhesive interface.

BRIEF DESCRIPTION OF THE DRAWINGS

FIG. 5 is the data table of the lateral push experiment of the present invention.

DETAILED DESCRIPTION OF THE PREFERRED EMBODIMENT

In order to achieve the above-mentioned purpose and effect of the present invention, the technical means and structure adopted by the present invention are illustrated in detail with respect to the preferred embodiments of the present invention and its structure and function are as follows, for the benefit of a complete understanding.

Figure 1:
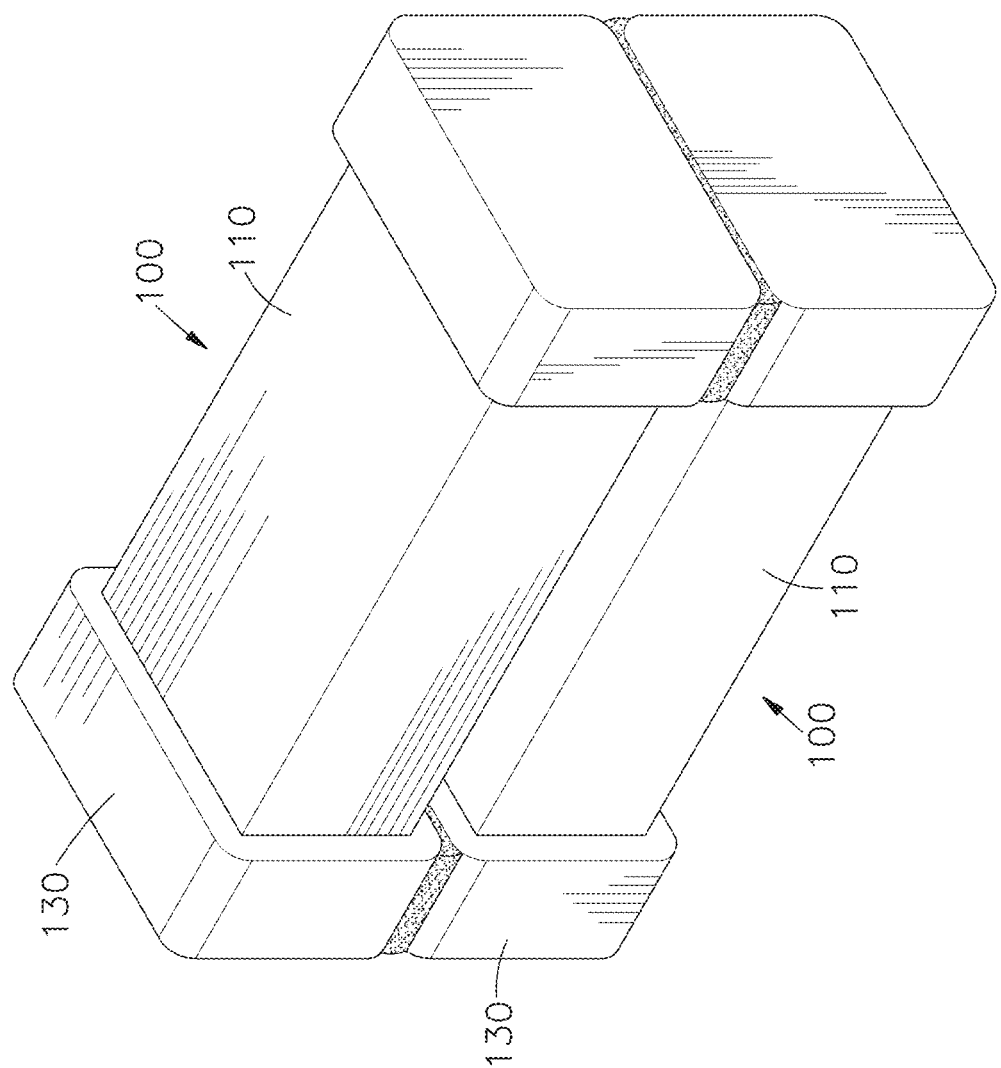
FIG. 1 is an oblique top elevational view of a leadless stack comprising ceramic capacitor in accordance with the present invention.
Figure 2:
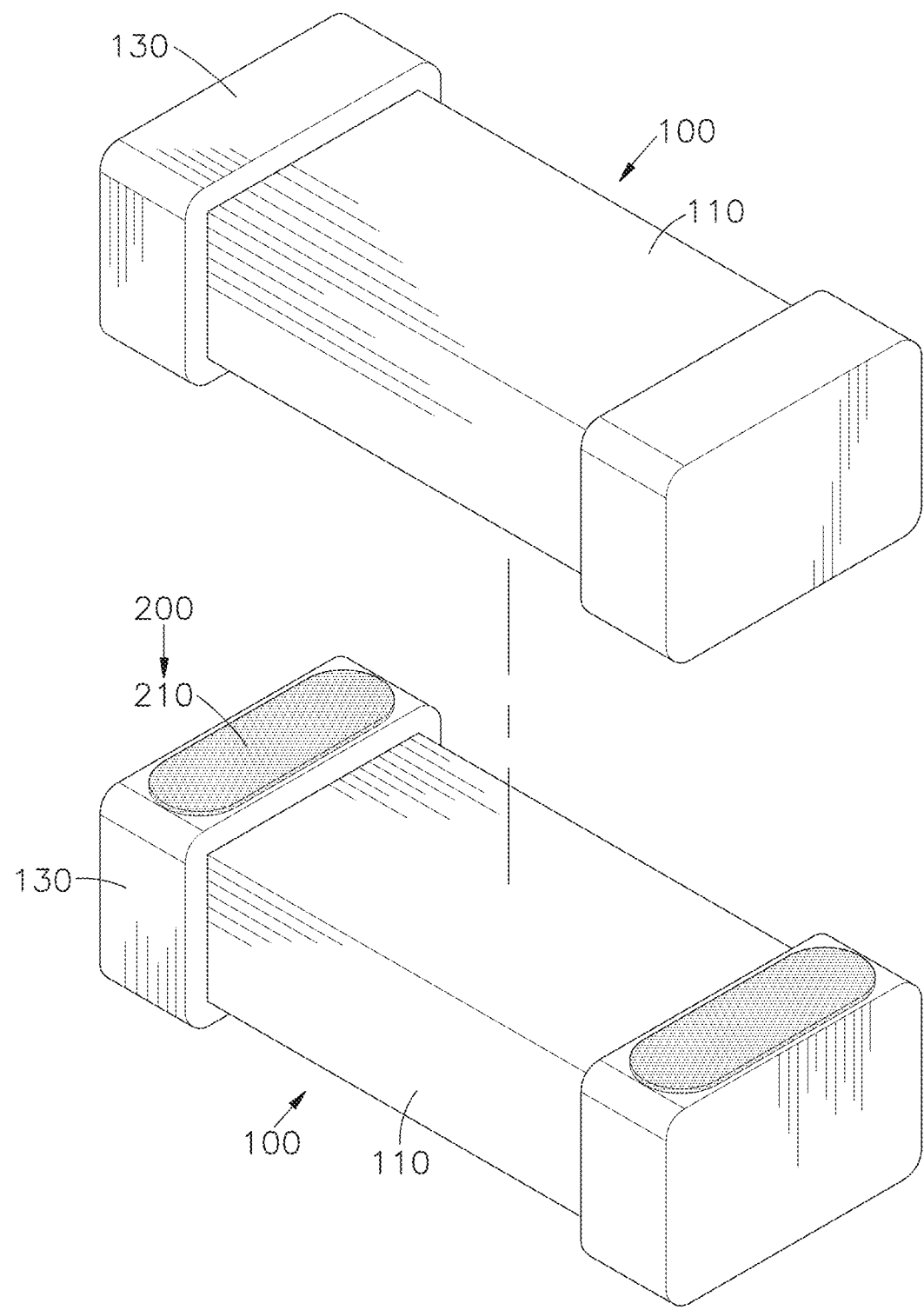
FIG. 2 is an exploded view of the leadless stack comprising ceramic capacitor shown in FIG. 1.
Figure 3:
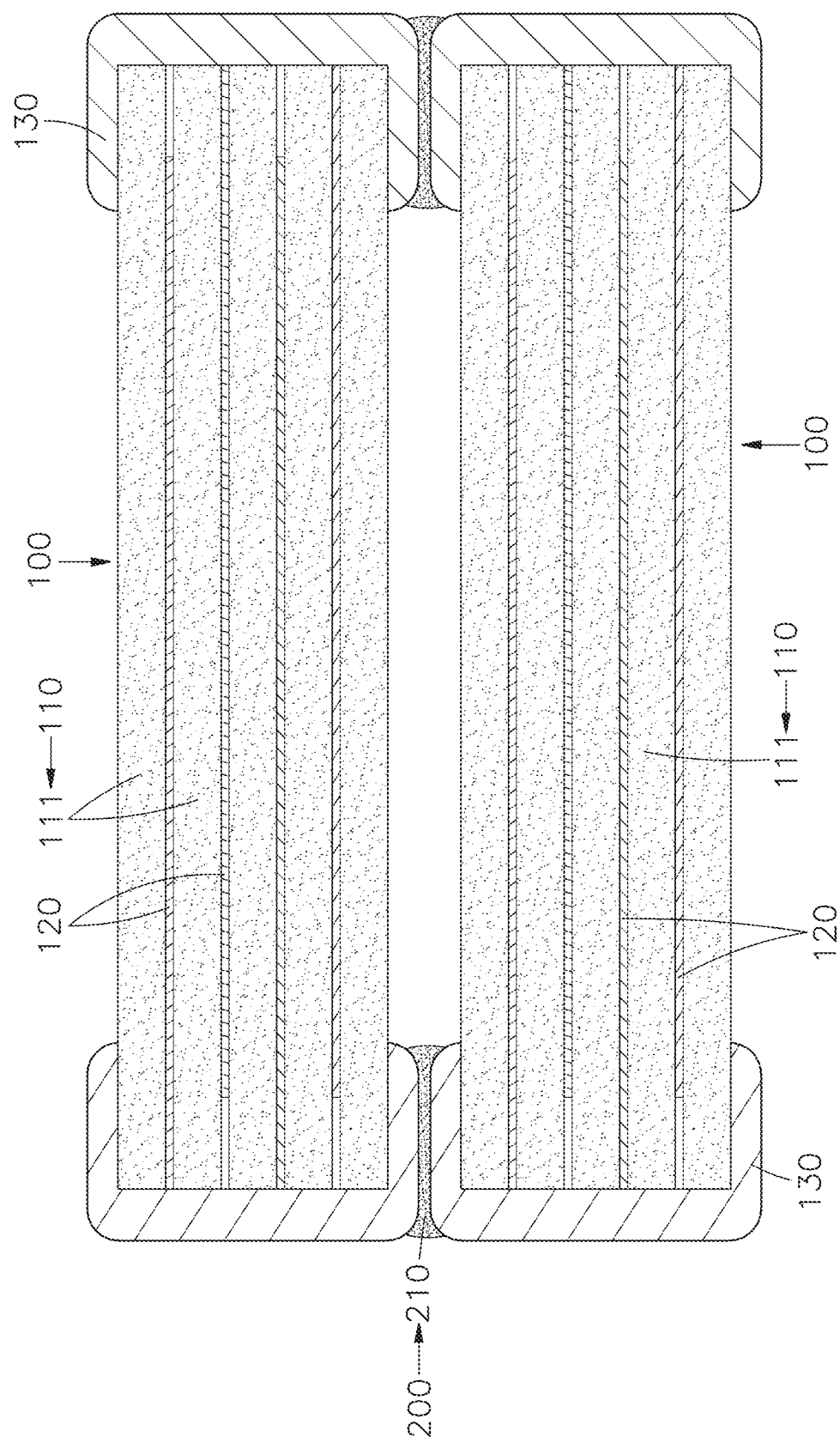
FIG. 3 is a sectional side view of the leadless stack comprising ceramic capacitor shown in FIG. 1.

Referring to FIGS. 1-3, an oblique top elevational view, an exploded view and a sectional side view of a leadless stack comprising ceramic capacitor in accordance with the present invention are shown. The leadless stack comprising ceramic capacitor comprises a plurality of multilayer ceramic capacitors 100 stacked vertically to each other, wherein each multilayer ceramic capacitor 100 comprises a capacitor body 110, a plurality of dielectric layers 111 stacked in each capacitor body 110, a plurality of internal electrodes 120 interspersed in each two adjacent dielectric layers 111 and arranged facing each other in a staggered manner with electrode ends thereof respectively exposed to two opposite ends of the capacitor body 110, and two external electrodes 130 respectively arranged on the two ends of the capacitor body 110 and electrically connected to the ends of the internal electrodes 120. The external electrode 130 is the innermost layer of the external electrode formed by burning copper or called burning copper layer. The external electrodes 130 of each two adjacent multilayer ceramic capacitors 100 are bonded and fixed in a temperature range of 150° C. to 200° C. through a polymer conductive adhesive 210 to form a adhesive interface 200 at each end without welding.

In this embodiment, two multilayer ceramic capacitors 100 are vertically stacked up and down, and the external electrodes 130 of the two multilayer ceramic capacitors 100 are adhered and fixed to each other through the polymer conductive adhesive 210 to form the adhesive interface 200. The overall structure is a stack of multiple multilayer ceramic capacitors 100. The stacking method is to first apply the polymer conductive adhesive 210 to the upper surface of the external electrodes 130 of the first multilayer ceramic capacitor 100, and to attach the lower surface of the external electrodes 130 of the second multilayer ceramic capacitor 100 to the polymer conductive adhesive 210. On the conductive adhesive 210, at the same time, make the burnt copper of the external electrodes 130 of the second multilayer ceramic capacitor 100 correspond to the burnt copper of the external electrodes 130 of the first multilayer ceramic capacitor 100 and stack them on the same position, and then proceed low temperature operation about 150~200° C. temperature range without welding. After the polymer conductive adhesive 210 is cured, the two adjacent external electrodes 130 can be adhered and fixed to form the adhesive interface 200 with support strength and as a conductive channel for the two adjacent external electrodes 130, so that two multilayer ceramic capacitors 100 can be electrically conducted to form a series combination. Its total capacitance value is higher than that of a single multilayer ceramic capacitor 100, and because the capacitor stack structure does not need to be heated at high temperature to form a bond, in addition to less process variation factors, the damage to the capacitor body can also be minimized.

In the present invention, the external electrodes 130 of the plurality of multilayer ceramic capacitors 100 are bonded to each other using polymer conductive adhesive 210 as the bonding material, and after curing, the adhesive interface 200 can be formed to provide support strength and conductive channels. The composition of polymer conductive adhesive 210 comprises 75%~85% of metal powder and 15%~25% of viscose, wherein the metal powder is selected from the group consisting of silver (Ag), copper (Cu) and nickel (Ni), and the adhesive uses a polymer resin, and has a special viscous strength. The better specification is the polymer conductive adhesive of H926 commercially available product specification, such as resin silver glue, and the suitable ratio can also be adjusted according to different requirements of polymer (generally called polymer) resin, fluidity or conductivity, etc., or can adjust the suitable ratio according to the specifications of different models of multilayer ceramic capacitor 100 and the number of stacks. For example, the polymer resin can contain 75% to 85% of the metal powder without affecting the purpose of the present invention, but it is not limited to this. Graphene can also be added to the polymer resin, and the metal powder and graphene can be further adjusted. The suitable ratio of different compositions of polymer resin makes the polymer conductive adhesive 210 more excellent in conductivity. Because the adhesive interface 200 formed by the resin silver glue has the strong and tough characteristics of a polymer material, and after the resin is cured, it can provide sufficient adhesion strength to support the capacitor stack structure. Moreover, the polymer components contained in the resin can give the toughness required to absorb the bending or vibration energy of the board, and it can effectively resist the mechanical damage caused by the repeated bending of the board or the vibration environment. In addition, the number of multilayer ceramic capacitors 100 that can be stacked in the above-mentioned capacitor stack structure is not fixed, and two or more can be stacked according to the specifications (such as volume and weight) of different types of multilayer ceramic capacitors 100. The preferred implementation is between two to four, and the adhesive interface 200 can still provide sufficient support strength without collapse. The composition of the polymer conductive adhesive 210 used in the adhesive interface 200 can be adjusted according to different multilayer ceramic capacitors 100 and the number of stacks. In order to enable the metal powder to be more uniformly and finely dispersed in the polymer resin to produce a more stable conductive channel, the selected metal powder particle size can also be between 0.3 and 5.0 μm. In addition, when the number of stacked capacitors increases, the closer the multilayer ceramic capacitor 100 to the bottom side, the greater the load. In order to avoid polymer resin from collapsing during curing, the higher the weight-bearing polymer resin, the higher the viscosity coefficient, or the higher the strength of the adhesive interface 200 after curing, so as to form a supporting force enough to bear the load of multiple multilayer ceramic capacitors 100.

Figure 4:
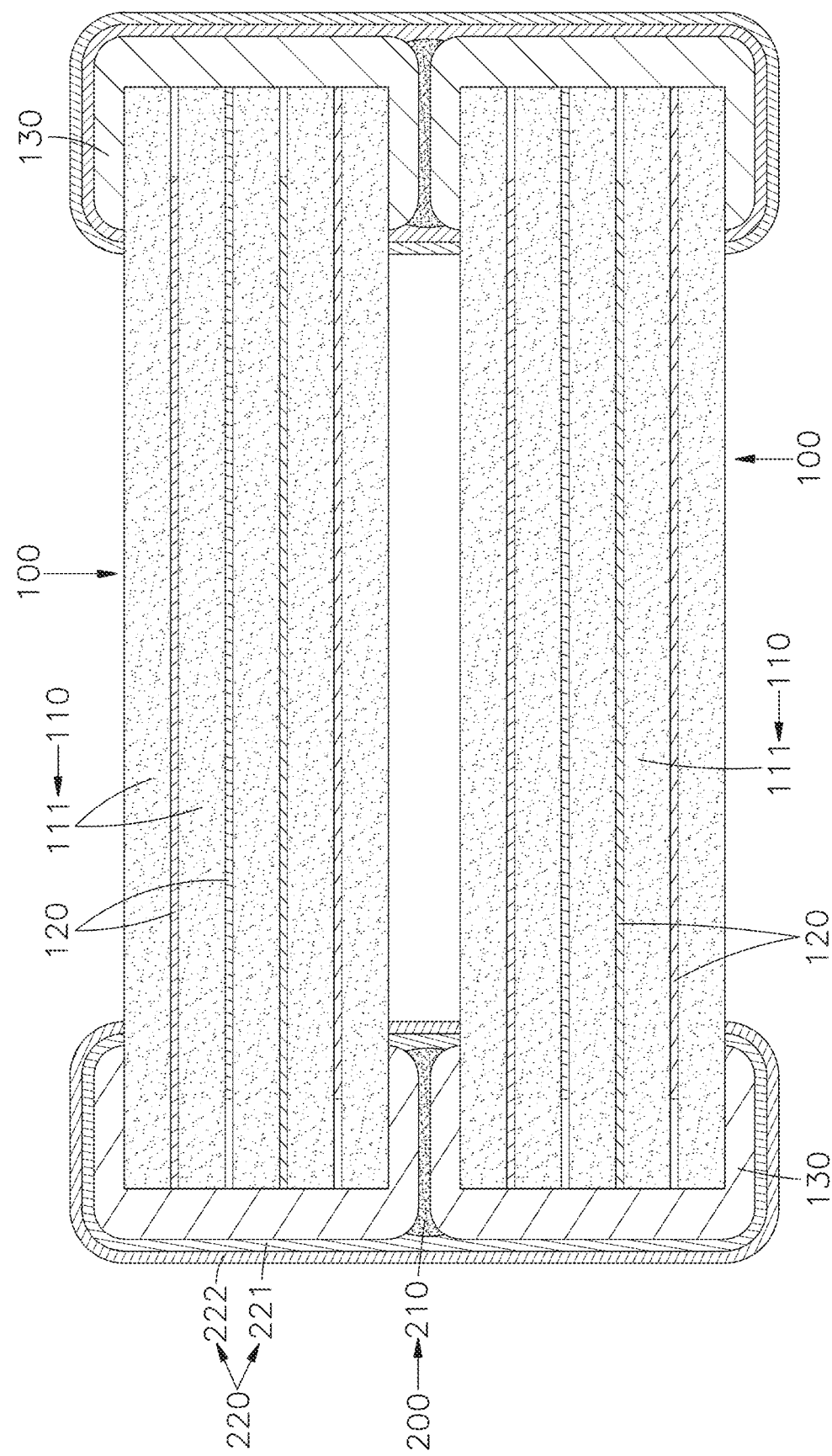
FIG. 4 is a sectional side view of an alternate form of the leadless stack comprising ceramic capacitor in accordance with the present invention.

As shown in FIG. 4, in this embodiment, the external electrodes 130 where the multiple multilayer ceramic capacitors 100 are stacked are applied with a polymer conductive adhesive 210 to form the adhesive interface 200. The outside of each adhesive interface 200 can be electroplated to form a first plating layer 221 and a second plating layer 222 of an electroplating strengthening layer 220 with nickel plating and tin plating in sequence. Since the polymer conductive adhesive 210 contains 75%~85% of sufficient metal powder, it can react with the electroplating solution to form a uniform and detailed electroplating surface, so that any micro cracks or micro gaps on the adhesive interface 200 will be filled by the electroplating strengthening layer 220 after electroplating to avoid the formation of cracked nuclei. However, it is not limited to this.

It is also possible to co-extend each adhesive interface 200 and the external electrodes 130 of the multilayer ceramic capacitors 100 to form the flat side surface of the electroplating strengthening layer 220, so that the electroplating strengthening layer 220 can completely cover the external electrodes 130 of the multiple multilayer ceramic capacitors 100, thereby strengthening the mechanical strength of the adhesive interface 200. Or, the external electrodes 130 at one end of multiple multilayer ceramic capacitors 100 or multiple burnt copper layers can be covered by the same continuous and uninterrupted surface electroplating strengthening layer 220, so as to form a special external terminal electrode that can achieve the effect of multiple ceramic capacitors in series at the same time. Or, the electroplating strengthening layer 220 covers the external electrodes 130 of vertically stacked multilayer ceramic capacitors 100 that use polymer conductive adhesive 210 to form the adhesive interface 200. This type of leadless stack comprising ceramic capacitor can eliminate the use of metal leads and the troubles and limitations of high-temperature heating of TLPS paste as a bonding material. In addition to simplifying the manufacturing process, the curing temperature of the polymer conductive adhesive 210 without soldering is relatively low, so that the process variation factors are relatively reduced, so as to achieve the purpose of improving product yield and reducing costs.

Figure 6:
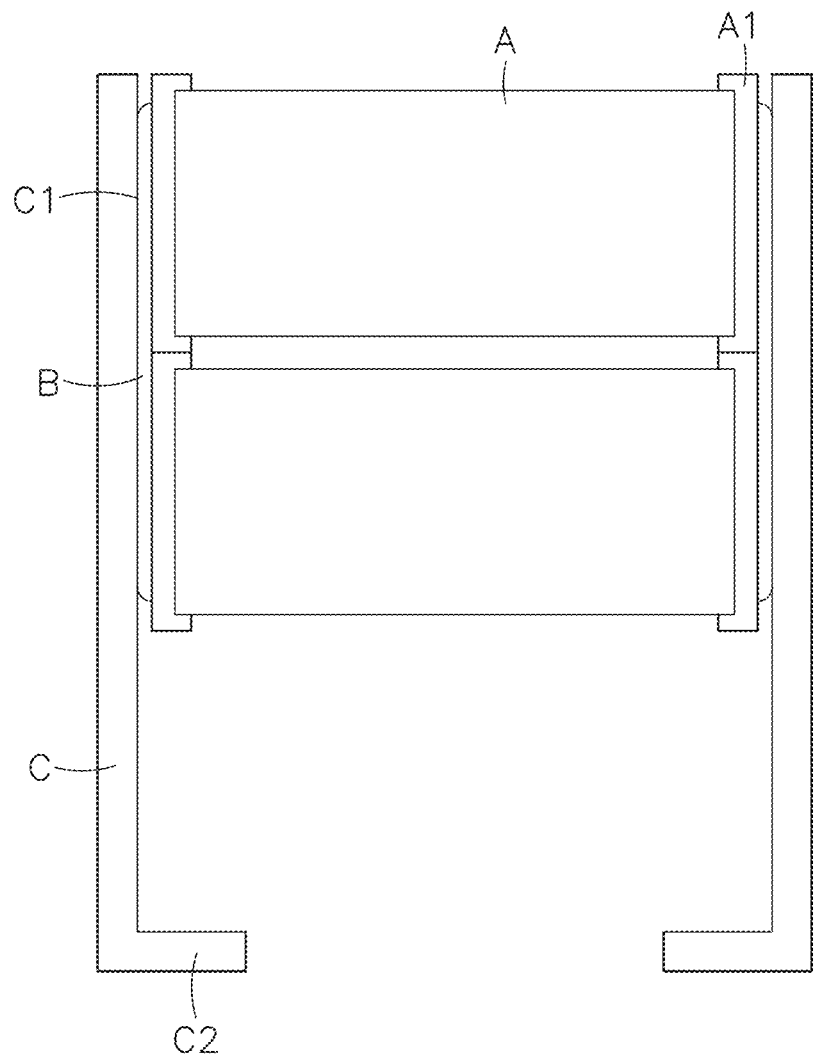
FIG. 6 is a schematic sectional side view of a conventional multilayer ceramic capacitor stack.

Please refer to FIGS. 5-6, which can be learned from the data table of the leadless stack comprising ceramic capacitor (without lead frame) of the present invention and the conventional multilayer ceramic capacitor (with lead frame) as the comparison group for the side push experiment. The average lateral thrust (AVG) measured in the comparison group was approximately 166.7N. f. The range of the minimum (MIN) and maximum (MAX) lateral thrust is between 120~180N. f, it is the mechanical strength level of the multilayer ceramic capacitors with lead frame on the market. Specifically, even if the leadless stack comprising ceramic capacitor of the experimental group of the present invention removes the metal leads (without lead frame), the actual measured average lateral thrust (AVG) is about 165.228N·f., and the range of the minimum (MIN) and maximum (MAX) lateral thrust is between 133.28~176.4N·f. The overall lateral strength value performance is not inferior to multilayer ceramic capacitors with metal leads, but the production process is far more simplified than the comparison group above. Even if metal leads are not used for surface mounting (SMT) on the circuit board, it still has the toughness required to absorb the bending or vibration energy of the board, and will not cause unpredictable levels of stress in the stacking position of the multilayer ceramic capacitors 100 or the adhesive interface 200 damage, it can effectively resist mechanical damage caused by repeated plate bending or vibration environment.

Regarding the leadless stack comprising ceramic capacitor of the experimental group of the present invention, its manufacturing process does not need to be formed by high temperature heating or secondary heating like transient liquid phase sintering. It can be changed to a low temperature of about 150 to 200° C. to form a solidified bonding point with supportive strength. In addition to minimizing the damage to the capacitor body, the polymer conductive adhesive has a good electroplating effect because it contains 75~85% of metal powder. Any micro-cracks or micro-gaps located at the burnt copper or solidified bonding point will be filled by the electroplating strengthening layer 220 after the electroplating process. If you carefully observe the burnt copper on either side, they can use the same first plating layer 221 and second plating layer 222, and the polymer conductive adhesive 210 or the cured adhesive interface 200 at the same time can be strengthened by the first plating layer 221 and the second plating layer 222.

Therefore, even after the reflow process, the cured adhesive interface 200 did not cause the reliability of the adhesive to break down. In addition, the better specification of the adhesive is to choose the polymer conductive adhesive of the H926 commercial product specification, but the number of stacked capacitors is different, and it may even increase to five or six or more. Choosing the viscous strength to meet the support strength requirements and mixing conductive adhesives containing 75~85% metal powder are listed as options. The principle of 75~85% is the weight percentage, but it is not limited to this. As long as it does not deviate from the scope of the invention and enables the stacked capacitors to use the same first plating layer 221 and second plating layer 222 on the outside of the burnt copper layer, then 75~85% can also be a volume percentage. The only thing to note is that the more the number of stacked capacitors, or the larger the size and weight of the capacitors, the viscosity requirements usually increase. At this time, a higher viscosity adhesive is required to increase the support strength of the capacitor stack. Further, the polymer conductive adhesive 210 contains 15~25% of viscose on the one hand, and its viscose uses polymer resin and is mainly selected from the group consisting of polyacetylenes, polythiophenes, polypyrroles, polyanilines and polyaromatic ethylene, epoxy resins, phenolic resins, urea resins, melamine resins, unsaturated polyester resin, silicone resin and polyurethane. On the other hand, it contains 75~85% metal powder, which is used as the main conductive medium, but in addition to metal powder, the conductive medium can also be selected from the group consisting of metal foil, metal fiber, and carbon-based conductive mixtures. The conductive component contained in the metal or conductive additive is a material selected from the group consisting of nickel, silver, copper, palladium, gold, zinc and their alloys. The carbon-based conductive mixture may also be added with a material selected from the group consisting of activated carbon, carbon fiber, and carbon nanotubes. More specifically, the physical properties required by polymer conductive adhesive 210 include viscosity 47±5 Pa·s at room temperature of 25° C., adhesion strength ≥20 N/mm, specific resistance ≤4.0×10-4 Ω·cm. In this way, the adhesive interface 200 of the leadless stack comprising ceramic capacitor of the experimental group of the present invention will be formed by bonding and fixing in the temperature range of 150° C.~200° C. without welding operation.

Although the so-called first plating layer 221 and second plating layer 222 are usually formed by electroplating, thanks to the polymer conductive adhesive containing 75~85% of metal powder, if it is changed to sputter, CVP, PVD or ion vapor deposition, the first plating layer 221 and the second plating layer 222 can be formed smoothly on the burnt copper and the outermost side of the polymer conductive adhesive 210, and it is also possible to form a special external electrode layered structure that shares the same first plating layer 221 and second plating layer 222 on either side of each ceramic capacitor. When formed by electroplating, the thickness of the first plating layer 221 or the second plating layer 222 is 0.1 μm~20 μm, and the preferred thickness is 3 μm~10 μm. When it is formed by sputtering, CVP, PVD or ion vapor deposition, the thickness of the first plating layer 221 and the second plating layer 222 is 0.1 nm~2 μm. The material of the first plating layer 221 or the second plating layer 222 is selected from the group consisting of nickel, tin, copper, silver, platinum, palladium and gold.

The material of the internal electrodes 120 of the multilayer ceramic capacitor 100 is selected from the group consisting of nickel, nickel-containing alloys, nickel-containing compounds and nickel-containing organic composite materials, or selected from the group consisting of copper, copper-containing alloys, copper-containing compounds and copper-containing organic composite materials, or selected from the group consisting of palladium, palladium-containing alloys, palladium-containing compounds and palladium-containing organic composite materials. For example, the nickel-containing alloy internal electrode may be Ni—Cu alloy internal electrode, Ni—Sn alloy internal electrode, and Cu or Sn content of about 1 to 3% can effectively inhibit the volume shrinkage of the internal electrode at high temperatures. In addition, in terms of the shape design of the internal electrode, in order to pursue the voltage resistance effect, the corners of the core of the internal electrodes 120 can be chamfered with a radius of curvature, so that the physical shape of the chamfered corners of the core becomes such as arc rounded corners or fan-shaped rounded corners, etc., so as to increase the ability of the internal electrode to withstand instantaneous voltage or stress damage, avoiding energy concentration caused by the sharpness of the corners when the number of layers of the internal electrode 120 increases.

Furthermore, in the leadless stack comprising ceramic capacitor of the experimental group of the present invention, taking the vertical stacking above and below as an example, the lower surfaces of the external electrodes 130 of the second multilayer ceramic capacitor 100 are respectively attached to the respective polymer conductive adhesives 210, and the burnt copper of the external electrodes 130 of the second multilayer ceramic capacitor 100 corresponds to the burnt copper of the external electrodes 130 of the first multilayer ceramic capacitor 100 at the same position and stacked on top of it. The purpose of the so-called burnt copper is to directly form an electrical connection with the end of the internal electrode 120. It is mainly through high-temperature sintering to form a conductive layer containing copper metal components. The conductive layer formed by sputtering is also a possible alternative in the future. However, the alternative option of burnt copper or conductive layer that directly forms an electrical connection with the end of the internal electrode 120 does not include conductive resin or polymer conductive adhesive, because it is easy to cause poor heat dissipation problems.

The above detailed description is for the description of a preferred feasible embodiment of the present invention, but the embodiment is not used to limit the scope of the patent application of the present invention, and other equivalent changes and modifications completed without departing from the spirit of the technique disclosed in the present invention shall be included in the scope of patents covered by the present invention.

In summary, the leadless stack comprising ceramic capacitor of the present invention can indeed achieve its effects and purposes when used. Therefore, the present invention is an invention with excellent practicality. In order to meet the requirements of an invention patent, an application is filed in accordance with the law.

What the invention claimed is:

1. A leadless stack comprising ceramic capacitor, comprising:
    a plurality of multilayer ceramic capacitors stacked vertically to each other, each said multilayer ceramic capacitor comprising a capacitor body, a plurality of Ni—Sn alloy internal electrodes interlaced with each other and interspersed in said capacitor bodies of said multilayer ceramic capacitors, ends of said Ni—Sn alloy internal electrodes respectively exposed to two opposite ends of said capacitor body, and two external electrodes respectively arranged on the two opposite ends of said capacitor body of each said multilayer ceramic capacitor and electrically connected to the ends of said Ni—Sn alloy internal electrodes; and
    an adhesive interface bonded between said external electrodes of each two adjacent said multilayer ceramic capacitors by curing with no soldering operation through a polymer conductive adhesive, said polymer conductive adhesive containing 75%-85% metal powder and 15%-25% viscose,
    wherein said Ni—Sn alloy internal electrodes comprise 1-3% Sn contents.

2. The leadless stack comprising ceramic capacitor as claimed in claim 1, wherein each said multilayer ceramic capacitor further comprises a plurality of dielectric layers stacked in said capacitor body, and said Ni—Sn alloy internal electrodes are interspersed in each two adjacent said dielectric layers and arranged facing each other in a staggered manner.

3. The leadless stack comprising ceramic capacitor as claimed in claim 1, wherein said polymer conductive adhesive is cured at a low temperature in a temperature range of 150° C. to 200° C. with no soldering operation, and each two adjacent said external electrodes of said multilayer ceramic capacitors are adhered and fixed to said adhesive interface.

4. The leadless stack comprising ceramic capacitor as claimed in claim 1, wherein said polymer conductive adhesive contains a metal powder selected from the group consisting of silver, copper and nickel.

5. The leadless stack comprising ceramic capacitor as claimed in claim 4, wherein a particle size of said metal powder is between 0.3 to 5.0 µm.

6. The leadless stack comprising ceramic capacitor as claimed in claim 1, wherein the polymer conductive adhesive comprises a polymer resin as an adhesive.

7. The leadless stack comprising ceramic capacitor as claimed in claim 6, wherein said polymer resin contains graphene.

8. The leadless stack comprising ceramic capacitor as claimed in claim 1, further comprising an electroplating strengthening layer formed on an outside of said adhesive interface of a stacking position of said external electrode of each two adjacent said multilayer ceramic capacitors.

9. The leadless stack comprising ceramic capacitor as claimed in claim 8, wherein said electroplating strengthening layer comprises a first plating layer and a second plating layer formed in sequence on the outside of said adhesive interface by electroplating.

10. The leadless stack comprising ceramic capacitor as claimed in claim 9, wherein said first plating layer and said second plating layer are nickel plating and tin plating, respectively.

11. The leadless stack comprising ceramic capacitor as claimed in claim 8, wherein said electroplating strengthening layer is a continuous uninterrupted surface and is located outside of said external electrodes at one end of the plurality of multilayer ceramic capacitors.

12. A leadless stack comprising ceramic capacitor, comprising a plurality of multilayer ceramic capacitors stacked vertically to each other, each said multilayer ceramic capacitor comprising a capacitor body, a plurality of Ni—Sn alloy internal electrodes interlaced with each other and interspersed in said capacitor bodies of said multilayer ceramic capacitors, ends of said Ni—Sn alloy internal electrodes respectively exposed to two opposite ends of said capacitor body, and two external electrodes respectively arranged on the two opposite ends of said capacitor body of each said multilayer ceramic capacitor and electrically connected to the ends of said Ni—Sn alloy internal electrodes, wherein each said external electrode comprises an electroplating strengthening layer and a plurality of burnt copper layers, said electroplating strengthening layer being located outside the associating said external electrode and covering each said burnt copper layer, each said burnt copper layer being located inside the associating said external electrode and respectively covering the end of one respective said Ni—Sn alloy internal electrode, said burnt copper layers being connected to each other through a polymer conductive adhesive to form an adhesive interface, said polymer conductive adhesive containing 75%-85% metal powder and 15%-25% viscose, wherein said Ni—Sn alloy internal electrodes comprise 1-3% Sn contents.

13. The leadless stack comprising ceramic capacitor as claimed in claim 12, wherein each said multilayer ceramic capacitor further comprises a plurality of dielectric layers stacked in said capacitor body, and said Ni—Sn alloy internal electrodes are interspersed in each two adjacent said dielectric layers and arranged facing each other in a staggered manner.

14. The leadless stack comprising ceramic capacitor as claimed in claim 12, wherein said polymer conductive adhesive is cured at a low temperature in a temperature range of 150° C. to 200° C. with no soldering operation, and each two adjacent said external electrodes of said multilayer ceramic capacitors are adhered and fixed to said adhesive interface.

15. The leadless stack comprising ceramic capacitor as claimed in claim 12, wherein said polymer conductive adhesive contains a metal powder selected from the group consisting of silver, copper and nickel.

16. The leadless stack comprising ceramic capacitor as claimed in claim 15, wherein a particle size of said metal powder is between 0.3 to 5.0 µm.

17. The leadless stack comprising ceramic capacitor as claimed in claim 12, wherein the polymer conductive adhesive comprises a polymer resin as an adhesive, said polymer resin contains graphene.

18. The leadless stack comprising ceramic capacitor as claimed in claim 12, wherein said electroplating strengthening layer comprises a first plating layer and a second plating layer formed in sequence on the outside of said adhesive interface by electroplating, said first plating layer and said second plating layer are nickel plating and tin plating, respectively.

19. The leadless stack comprising ceramic capacitor as claimed in claim 18, wherein said electroplating strengthening layer is a continuous uninterrupted surface and is located outside said external electrodes at one end of a plurality of said multilayer ceramic capacitors.

* * * * *